United States Patent [19]

Takada

[11] Patent Number: 4,585,247
[45] Date of Patent: Apr. 29, 1986

[54] BODY FRAME OF A SMALL-SIZED VEHICLE

[75] Inventor: Minoru Takada, Houya, Japan

[73] Assignee: Honda Giken Kogyo Kabushiki Kaisha, Japan

[21] Appl. No.: 634,522

[22] Filed: Jul. 26, 1984

[30] Foreign Application Priority Data

Jul. 26, 1983 [JP] Japan .................. 58-115151[U]
Aug. 4, 1983 [JP] Japan .................. 58-120809[U]

[51] Int. Cl.⁴ .................. B62K 19/22; B62K 19/32
[52] U.S. Cl. .................. 280/281 R; 403/290;
403/354; 403/361; 403/381
[58] Field of Search .................. 280/281 R, 281 LP;
403/354, 361, 383, 381, 289, 290

[56] References Cited

U.S. PATENT DOCUMENTS

| | | | |
|---|---|---|---|
| 658,493 | 9/1900 | Trigwell | 403/290 X |
| 1,368,541 | 2/1921 | Bradshaw | 180/227 |
| 1,447,676 | 3/1923 | Lewis | 280/281 R |
| 1,826,432 | 10/1931 | Owen | 403/290 |
| 3,030,124 | 4/1962 | Holloway | 280/281 R |

FOREIGN PATENT DOCUMENTS

| | | | |
|---|---|---|---|
| 593628 | 8/1925 | France | 403/383 |
| 367540 | 7/1939 | Italy | 280/281 R |
| 16422 | of 1896 | United Kingdom | 280/281 R |
| 630558 | 10/1949 | United Kingdom | 280/281 R |

*Primary Examiner*—John A. Pekar
*Attorney, Agent, or Firm*—Armstrong, Nikaido, Marmelstein & Kubovcik

[57] ABSTRACT

A body frame of a small-sized vehicle such as a motorcycle or the like is assembled by interconnecting a plurality of frame elements. Among at least one pair of the frame elements, a connecting portion of one frame element is fitted into a connecting portion of the other frame element, and the respective connecting portions are firmly connected with each other by means of an adhesive agent. Moreover, the cross-section shapes of the both connecting portions are made non-circular, that is, not a simple circular shape, and thereby the interconnecting structure is very strong and rigid against a torsional force exerted thereupon.

2 Claims, 10 Drawing Figures

BODY FRAME OF A SMALL-SIZED VEHICLE

BACKGROUND OF THE INVENTION

The present invention relates to a body frame of a small-sized vehicle such as a motorcycle a motortricycle or the like, and more particularly to an interconnecting structure between frame elements forming a body frame of such a small-sized vehicle.

In the case of employing a pipe frame for a body frame of such a small-sized vehicle, upon connecting respective frame pipes, a lug is used and a lug and frame pipes are jointed together by welding or brazing, or else a lug is omitted and frame pipes are directly jointed together by arc welding. Not only are skilled operations necessitated for achieving such jointing, but also the frame pipes and the lug must be brought to a red hot state over a wide range, hence thermal strain is liable to occur and so the strain must be reformed after jointing. In order to carry out this type of work, special treatment equipment is necessitated, which increases an amount of work and brings about higher cost.

Moreover, when frame pipes made of light alloy material are used for a body frame of a small-sized vehicle, generation of blowholes within a welding metal, inclusion of slag, cracking by welding, etc. are liable to occur, and therefore a very skilled welding operative is necessitated.

SUMMARY OF THE INVENTION

It is therefore one principal object of the present invention is to provide an interconnecting structure between frame elements forming a body frame of a small-sized vehicle, which does not rely upon welding connection.

Another object of the present invention is to provide an improved body frame of a small-sized vehicle in which even frame elements made of different materials can be rigidly interconnected with each other.

Still another object of the present invention is to priovide an improved body frame of a small-sized vehicle which does not necessitate a skilled operative for interconnecting frame elements.

Yet another object of the present invention is to provide an improved body frame of a small-sized vehicle which does not necessitate a special treatment equipment nor an additional amount of work for reforming frame elements after the frame elements have been interconnected with each other.

A further object of the present invention is to provide an improved body frame of a small-sized vehicle which can be manufactured with less labor and at a lower cost than such body frames in the prior art by employing a novel interconnecting structure between frame elements.

A still further object of the present inention is to provide an improved body frame of a small-sized vehicle in which frame elements are rigidly interconnected with each other against torsional moments exerted upon the frame elements.

According to one feature of the present invention, there is provided an interconnecting structure between frame elements forming a body frame of a small-sized vehicle, in which the frame elements to be interconnected are fitted to each other, and the fitting portions thereof are fixedly secured to each other by means of an adhesive agent.

According to another feature of the present invention, there is provided an interconnecting structure between frame elements forming a frame body of a small-sized vehicle, in which the frame elements to be interconnected are fitted to each other, and the fitting portions thereof have a non-circular cross-section shape and are fixedly secured to each other by means of an adhesive agent.

According to still another feature of the present invention, there is provided a body frame of a small-sized vehicle, in which frame elements forming the body frame have a non-circular cross-section shape at their portions to be interconnected, and the interconnecting portions of the frame elements are fitted to each other and fixedly secured to each other by means of an adhesive agent.

The above-mentioned and other features and objects of the present invention will become more apparent by reference to the following description of preferred embodiments of the invention taken in conjunction with the accompanying drawings.

BRIEF DESCRIPTION OF THE INVENTION

FIG. 1 is a perspective view partly cut away showing an interconnecting structure between frame elements in a motorcycle body frame according to one preferred embodiment of the present invention, FIG. 2 is a perspective view of a head pipe that is one of the frame elements, FIG. 3 is a perspective view of a cover member to be integrally jointed and secured to the head pipe, FIG. 4 is a perspective view of an essential part of a main pipe to be connected to the head pipe and the cover plate which cooperate with each other, FIG. 5 is a schematic elevation view of a motorcycle which empolys an interconnecting structure for frame elements according to another preferred embodiment of the present invention, FIG. 6 is a perspective view partly cut away illustrating one interconnecting structure between frame elements shown in FIG. 5, FIG. 6 is a disintegrated perspective view of the same interconnecting structure, FIG. 8 is a disintegrated perspective view similar to FIG. 7 showing a modified embodiment of the interconnecting structure between frame elements illustrated in FIGS. 6 and 7, FIG. 9 is a perspective view of an essential part of a motorcycle employing an interconnecting structure between frame elements according to still another preferred embodiment of the present invention, and FIG. 10 is a cross-section view showing an essential part of the interconnecting structure between frame elements shown in FIG. 9.

DESCRIPTION OF PREFERRED EMBODIMENTS

One preferred embodiment of the present invention is illustrated in FIGS. 1 through 4. A body frame of a motorcycle comprises a principal frame consisting of a head pipe which rotatably supports a rotary shaft of a steering handle, main pipes rigidly connected to the head pipe and extending over an engine towards the rear of a vehicle body, and down tubes which are also rigidly connected to the head pipe, extending downwards in front of the engine, further extending towards the rear of the vehicle body at the level of the bottom of the engine while supporting the engine, and are either directly connected to the rear end of the main pipe or connected to a lower end of a center pillar connected to the main pipe.

Figure 1:
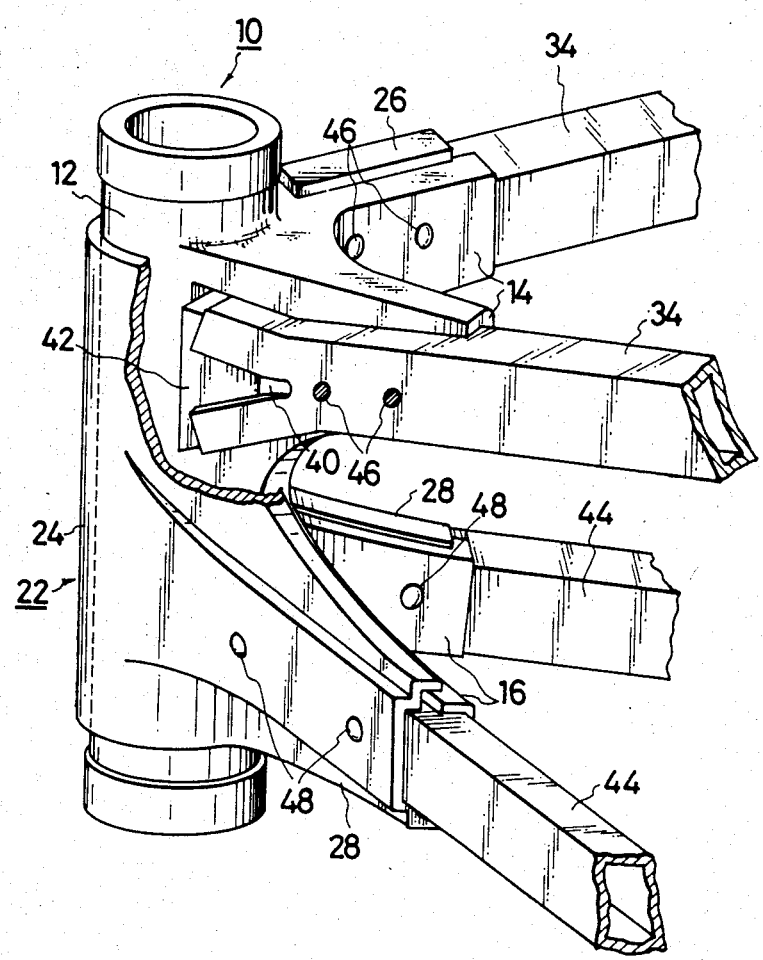

FIG. 1 shows a front head portion of such a body frame in a perspective view, in which a pair of main pipes 34 and a pair of down tubes 44 are connected to a head pipe 10. For the purpose of clarifyng the interconnecting relationship of these frame elements, at first description will be made individually on the configurations of the respective frame elements.

Figure 2:
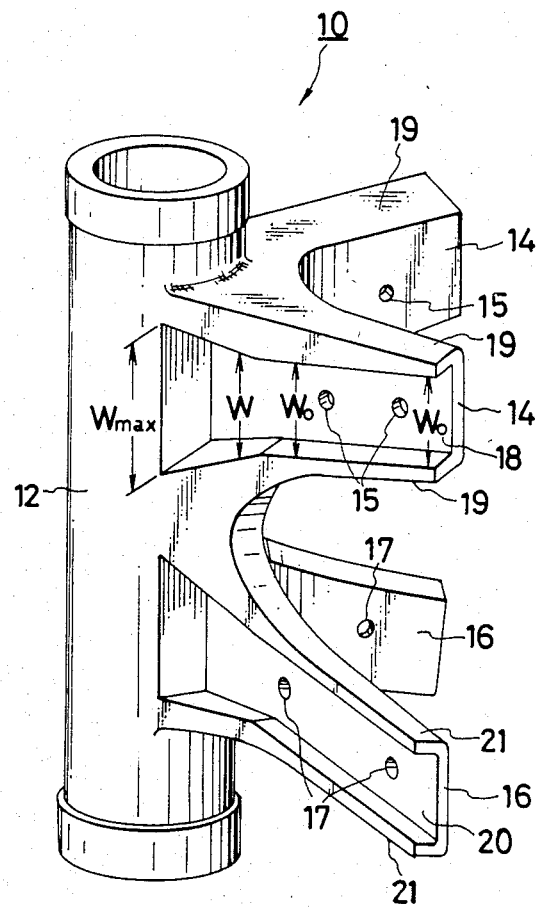

The head pipe 10 is formed of a head pipe main body 12, and upper and lower pairs of branch pieces 14 and 16, respectively, which project from a peripheral wall of the head pipe main body 12 in a V-shaped arrangement (See FIG. 2). The branch pieces 14 and 16 are pieces of substantially U-shape in cross-section having first pipe fitting grooves 18 and 20, respectively, on their outside surfaces, and with regard to the groove widths of the first pipe fitting 18 and 20, a groove width W of the portions near to the base ends of the branch pieces 14 and 16 is made larger than a groove width $W_o$ of the tip end portions and a groove width Wmax at the positions on the periphiral wall portions of the head pipe main body 12 is made the maximum. In FIG. 2, reference numerals 15 and 17 designate holes for inserting rivets.

Figure 3:
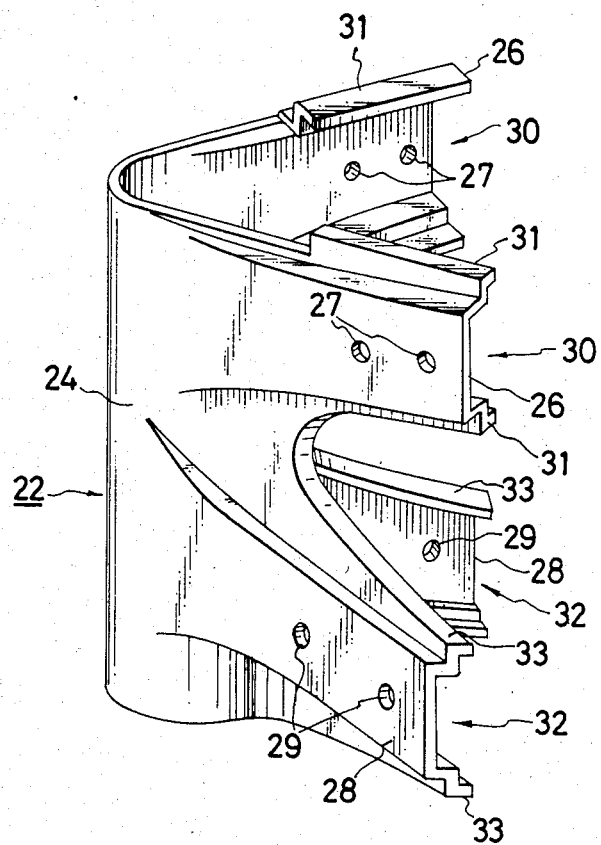

A cover member 22 is formed of a curved base plate portion 24 covering a front surface of the peripheral wall of the head pipe main body 12, and upper and lower pairs of branch pieces 26 and 28, respectively, which extend from the bass plate portion 24 in a V-shaped arrangement, and there are provided second pipe fitting grooves 30 and 32 extending from inside surface portions the base plate portion 24 along the inside surfaces of the respective branch pieces 26 and 28. The branch pieces 26 and 28 are pieces of substantially U-shape in cross-section (See FIG. 3). The second pipe fitting grooves 30 and 32 have configurations coresponding to those of the first pipe fitting grooves 18 and 20 in the head pipe 10, and the groove width on the side of the base plate portion 24 is larger than the groove width on the side of the branch pieces 26 and 28. In FIG. 3, reference numerals 27 and 29 designate holes for inserting rivets.

Figure 4:
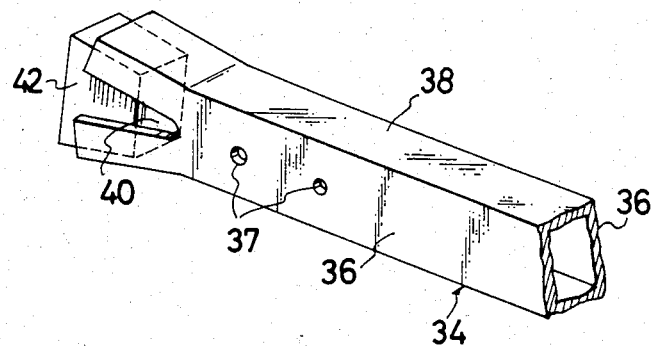

The main pipe 34 is an elongated body having a rectangular transverse cross-section, and in a pair of opposed walls of the tip end portion thereof to be connected to the head pipe 10 are formed slots 40 from their tip end edges, and a wedge 42 is struck into a tip end opening of the main pipe 34. In other words, in the main pipe 34 at its tip end portion another pair of opposed walls 38 are diverged outwardly, and so the distance between the opposed walls 38 is larger at the tip end portion than at the other portion (See FIG. 4). In FIG. 4, reference numeral 37 designates holes for inserting rivets. It is to be noted that since the configuration of a connecting portion of the down tube 44 is the same as that of the main pipe 34, further description and illustration thereof will be omitted.

Now, the method for assembling the respective members will be explained. At first, a structural adhesive agent (for example, epoxy resin, acrylic resin, etc.) is applied to outer peripheral surfaces of the connecting portions of the pair of main pipes 34 and the pair of down tubes 44, and these connecting portions are inserted into the first pipe fitting grooves 18 and 20 in the respective branch pieces 14 and 16 of the head pipe 10 from the sidewise directions of the branch pieces 14 and 16. Thereupon, the main pipes 34 and the down tubes 44 are inserted so that the diverged portions at the tip ends of the main pipes 34 and the down tubes 44 may just fit into the base end portions having an enlarged groove width of the first pipe fitting grooves. Subsequently, the above-described structural adhesive agent is applied either to the entire inner wall surface of the cover member 22 or to the portion of the inner wall surface of the cover member 22 except for the portions making contact with main pipes 34 and the down tubes 44, and the cover member 22 is jointed so as to cover the head pipe main body 12 and the connecting portions of the main pipes 34 and the down tubes 44 whose surfaces are already applied with the structural adhesive agent. Through these procedures, the main pipes 34 and the down tubes 44 protruding from the first pipe fitting grooves 18 and 20, respectively, and the second fitting grooves 30 and 32 would fit to each other, and flange portions 31 and 33 of the second pipe fitting grooves 30 and 32 would be jointed to the flange portions 19 and 21 of the first pipe fitting grooves 18 and 20 so as cover the latter.

Thereafter, the branch piece 14, the main pipe 34 and the branch piece 26 are connected together as reinforced by means of rivets 46 (FIG. 1) passing through the rivet insert holes 15, 27 and 37, while the branch piece 16, the down tube 46 and the branch piece 28 are connected together as reinforced by means of rivets 48 (FIG. 1). It is to be noted that the rivets 46 and 48 used as temporary reinforcing means during the period for curing the adhesive agent can also function as permanent auxiliary connecting means.

Owing to the above-described connecting relationship between the head pipe 10 and the respective pipe members 34 and 44, there exists an advantage that even if forces directed in the directions of extracting the respective pipes 34 and 44 from the locking holes formed by the first and second pipe fitting grooves 18 and 30 and by the first and second pipe fitting grooves 20 and 32, respectively, are exerted upon the main pipes 34 and the down tubes 44, respectively, excessive shearing forces would not act upon the layers of the adhesive agent because the diverged portions at their tip ends are confined by the narrow width portions of the first pipe fitting grooves 18 and 20 and the second pipe fitting grooves 30 and 32. In addition, even if forces adapted to separate the branch pieces 14 and 16 respectively from the branch pieces 26 and 28 are exerted upon the main pipes 34 and the down tubes 44, an anti-separation property between the joint surfaces of the respective members is excellent and the interconnection between the respective members can be stably maintained, because in addition to the mutual jointing between the respective members by means of an adhesive agent, they are supplementarily jointed by means of the rivets 46 and 48. And, while bending moments act upon the branch pieces 14, 16, 26 and 28 due to the above-mentioned forces, these members 14, 16, 26 and 28 are hardly deformed because they have a U-shaped transverse cross-section and thus have a great rigidity. Furthermore, even if torsional moments should act upon the connecting portions between the head pipe 10 and the respective pipes 34 and 44, relative displacements along the jointing surfaces therebetween would not occur owing to the fact that the transverse cross-section shape of the respective members at the connecting portions is a rectangular shape. Still further, although thermal deformations would be generated at the connecting portions according to a welding connection process, with the interconnecting structure according to the illustrated embodiment of the present invention in which the respective pipe members are jointed be means of an adhesive agent, thermal deformation would never be generated at the connecting portions, and hence a treatment for removing thermal strains normally included in an interconnecting work is unnecessary, so that production efficiency can be improved and lowering of costs can be achieved; Also, in contrast to the fact that in the case of employing pipe members made of light alloy material as the frame elements and interconnecting them by welding, a skilled operation technique is necessitated, the work of interconnecting the respective frame elements by means of an adhesive agent is relatively easy, and so, it has an advantage that a skilled operation technique is not necessitated. Moreover, if an adhesive agent is used, even interconnection between members made of different materials such as between a pipe member made of light alloy material and a pipe member steel, can be effected easily. This implies that reduction of a manufacturing cost as well as realization of a light weight of a vehicle body can be achieved by arbitrarily combining frame elements made of expensive materials and frame elements made of less expensive materials and by partly employing frame elements made of light-weight materials according to necessity.

It is to be noted that while the main pipes 34 and the down tubes 44 had a rectangular transverse cross-section shape througout their entire lengths in the above-described embodiment, it is also possible to use pipe members having a circular transverse cross-section except for the connecting portions thereof to the head pipe 10 in place of the above-described pipe members.

Now description will be made on another preferred embodiment of the present invention shown in FIGS. 5 to 7, a modified embodiment to the same shown in FIG. 8, and a still further embodiment of the present invention shown in FIGS. 9 and 10.

Figure 5:
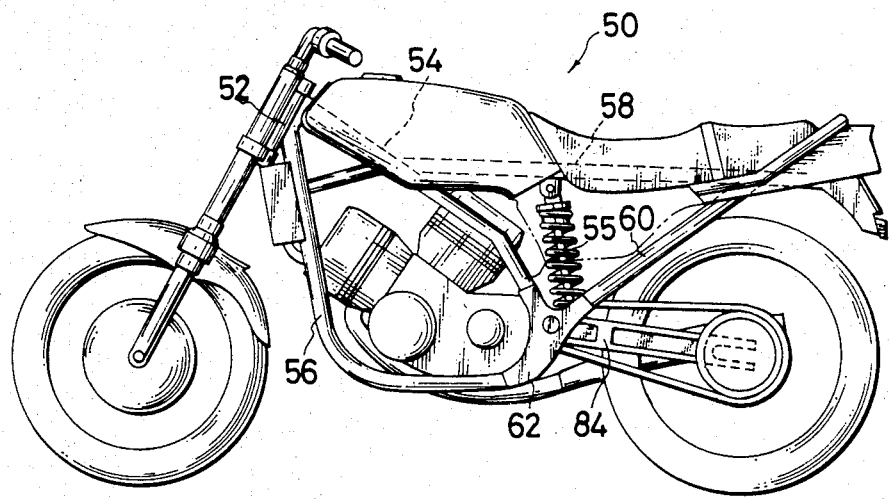

FIG. 5 shows a motorcycle 50 in a schematic elevation view. A body frame of the motorcycle 50 comprises a main frame consisting of a head pipe 52, main pipes 54 and down tubes 56 connected to the head pipe 52, seat rails 58 connected to the main pipes 54, center pillars 55 integrally formed with the main pipes 54, and back stays having one of their ends connected to the down tubes 56 and their other ends, that is, the top ends connected to the seat rails 58.

Figure 6:
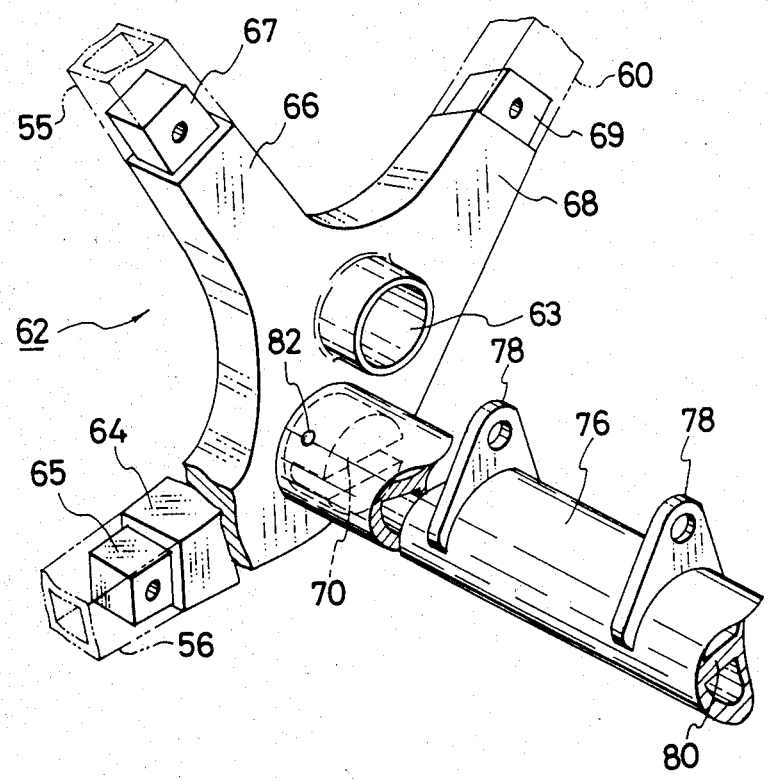
Figure 7:
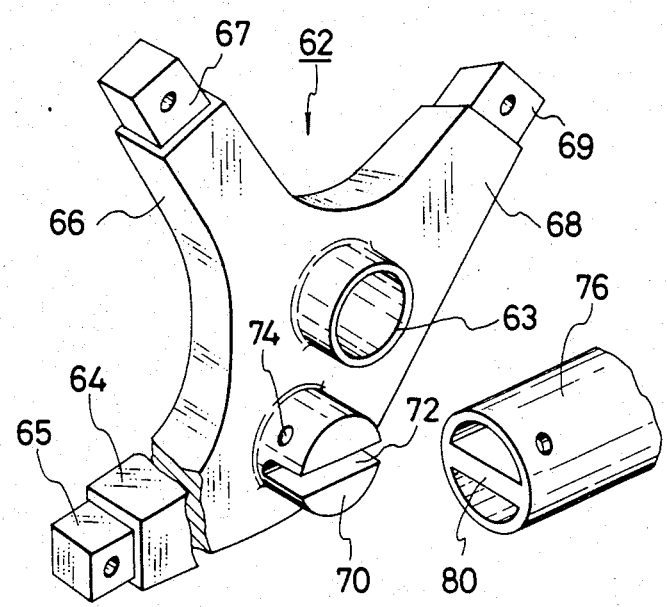

FIG. 6 shows in an enlarged perspective view a connecting member 62 for jointly connecting the center pillar 55, the back stay 60 and the down tube 56 (only connecting member positioned on the right side of a vehicle body being illustrated).

Each of the connecting members positioned respectively on the left and right sides of the vehicle body is a three-forked member, and tip end portions of its respective branch pieces 64, 66 and 68 are formed in a thinned rectangular rod shape serving as engaging portions 65, 67 and 69 for fitting into the respective frame elements. These respective engaging portions 65, 67 and 69 are fittid via the above-described structural adhesive agent into the down tube 56, the center pillar 55 and the back stay 60, respectively.

In addition, each of the left and right connecting members 62 has a rear fork mounting hole 63, and a rear fork 84 is swingably supported by a pivot bolt inserted into the rear fork mounting hole 63.

Furthermore, a cross pipe 76 is provided between the left and right connecting members 62. On this cross pipe 76 are integrally provided a pair of brackets 78 for mounting cushion links for the rear fork 84 as projected therefrom, and besides, a rib 80 adapted to divide the inner hollow space of the cross pipe main body into two chambers is provided integrally with the cross pipe 76 as shown in FIG. 7.

On the inside surface of the connecting member 62 is integrally provided a boss 70 serving as an engaging menber as projected therefrom, a slot 72 and a rivet insert hole 74 are formed in the boss 70, and the cross pipe 76 is tightly fitted to the boss 70 via the above-described structural adhesive agent. The rib 80 fits into the slot 72 (See FIG. 7).

In order to connect the cross pipe 76 to the connecting member 62, after an adhesive agent has been preliminarily applied either onto the entire surface of the boss 70 including the inside surface of the slot 72 or pnto the inner surface of the cross pipe 76 including the surface of the rib 80, the cross pipe 76 is fitted to the boss 70, then the both members 70 and 76 are temporarily connected by means of a rivet 82, and subsequently, the adhesive agent is cured by heating (in the case of a thermosetting resin) or by natural cooling (in the case of a thermoplastic resin). In this connection, even after the adhesive agent has been cured, it is desirable to leave the rivet 82 mounted as means for preventing disconnection.

In this way, the cross pipe 76 can be firmly jointed to the boss 70 of the connecting member 62. It is to be noted that although a torsional moment is exerted upon the cross pipe 76 due to the fact that the cushion links for the rear fork 84 are connected to the brackets 78, since the rib 80 of the cross pipe 76 is fitted in the slot 72 of the boss 70, the cross pipe 76 would not rotate around the boss 70. In addition, against a bending moment exerted upon the cross pipe 76 by the rear fork 84 via the cushion links, a sufficient mechanical strength and a sufficient rigidity of the cross pipe 76 can be assured by preliminarily aligning the direction of the rib 80 with the direction of the force generating the bending moment.

Figure 8:
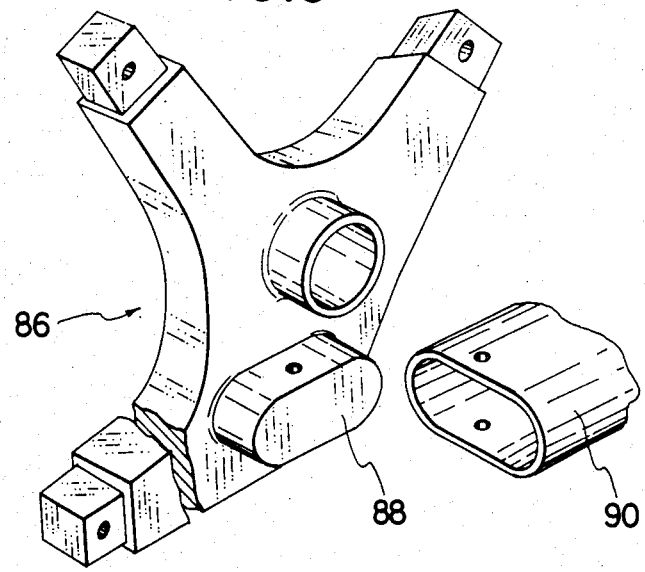

A boss 88 provided in association with a connecting member 86 shown in FIG. 8 which illustrates a modified embodiment to the connecting member 62, has a oval cross-section shape, and a cross pipe 90 to be fitted to this boss 88 via an adhesive agent also has an oval cross-section shape. In this modified embodiment also, similar effects and advantages to the first described embodiment can be realized. It is to be noted that if the direction of the major diameter of the cross pipe 90 is aligned with the direction of application of a bending load, then the resistance against the bending load is large, and so, this alignment is favorable. For the cross-section shape of the boss 88, besides the above-mentioned oval shape, an elliptic, rectangular or other shape can be employed.

Figure 9:
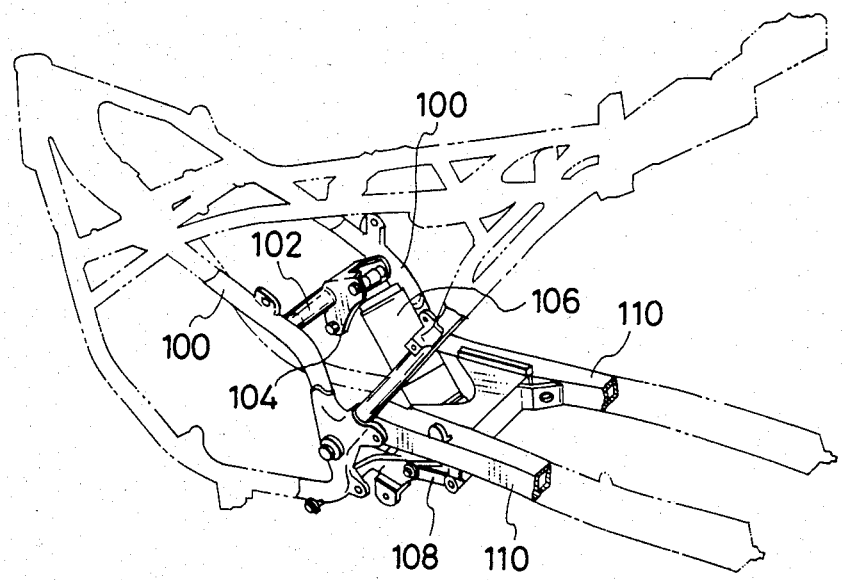
Figure 10:
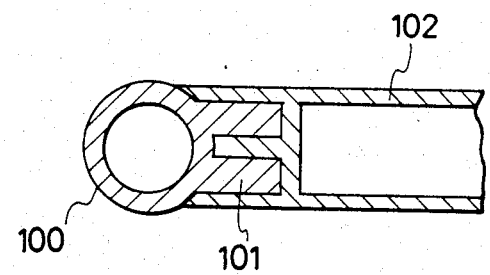

In another preferred embodiment shown in FIG. 9, a cross pipe 102 is connected to left and right main pipes 100 by means of a similar connecting structure to that of the above-described embodiments. On the cross pipe 102 are integrally provided brackets 104 as projected therefrom, and to the brackets 104 is connected on end of a rear cushion 106. The other end of this rear cushion 106 is connected via cushion links 108 to a front portion of a rear fork 110. The connecting structure between the cross pipe 102 and the main pipe 100 is shown in FIG. 10, in which a boss 101 integrally formed on the main pipe 100 as projected therefrom and the cross pipe 102 are jointed by means of the above-described adhesive agent.

As will be apparent from the above description, according to the present invention a novel connecting structure between frame elements in a body frame of a small-sized vehicle has been provided. According to this connecting structure, frame elements are mutually jointed and interconnected by means of an adhesive agent under a mutually fitted relationship, and the cross-section shape of the frame elements at least at their connecting portions is made non-circular. Therefore, according to the present invention, the following advantages can be obtained. That is, the advantages are that even if a torsional moment is exerted upon the interconnected frame elements, the connecting relationship at the connecting portion is always stable, that even in the case of interconnecting frame elements made of different materials, the connection can be effected easily in the quite same manner as in the case of interconnecting frame elements made of the same material, that a skilled operation technique is not necessitated for carrying out interconnection between frame elements, and that reduction of a weight of a vehicle body as well as lowering of a manufacturing cost can be achieved.

Since many changes and modification can be made to the above-described construction without departing from the spirit of the present invention, it is intended that all matter contained in the above description and illustrated in the accompanying drawings shall be interpreted to be illustrative and not as a limitation to the scope of the invention.

What is claimed is:

1. A body frame of a small-sized vehicle formed of a plurality of frame elements interconnected with one another, characterized in that said body frame comprises a head pipe having a plurality of branch pieces provided with first pipe fitting grooves on their side surfaces projected therefrom in a V-shaped arrangement, a cover member provided with a plurality of second pipe fitting grooves which cooperate respectively with corresponding ones of said first pipe fitting grooves, and a plurality of frame pipes having a larger cross-section size at their tip end portions than at the other portions, said first pipe fitting grooves have a larger cross-section size at the base portions of said branch pieces than that at their tip end portions, said second pipe fitting grooves have a configuration corresponding to that of said first pipe fitting grooves, said cover member covers the side surfaces of said respective branch pieces and a main body of said head pipe and is jointed to the head pipe by means of an adhesive agent, and said plurality of frame pipes are respectively jointed by means of an adhesive agent into and held by respective engaging holes of substantially rectangular shape in cross-section defined by said first and second pipe fitting grooves.

2. A body frame of a small-sized vehicle formed of a plurality of frame elements interconnected with one another, characterized in that said body frame comprises a head pipe having a plurality of branch pieces provided with first pipe fitting grooves on their side surfaces projected therefrom in a V-shaped arrangement, a cover member provided with a plurality of second pipe fitting grooves which cooperate respectively with corresponding ones of said first pipe fitting grooves, and a plurality of frame pipes, said cover member covers the side surfaces of said respective branch pieces and a main body of said head pipe and is jointed to the head pipe by means of an adhesive agent, and said plurality of frame pipes are respectively jointed by means of an adhesive agent into and held by respective engaging holes of substantially rectangular shape in cross-section defined by said first and second pipe fitting grooves.

* * * * *